United States Patent
Park et al.

(10) Patent No.: US 8,574,942 B2
(45) Date of Patent: Nov. 5, 2013

(54) METHOD OF FORMING SILICON NANOWIRES AND METHOD OF FABRICATING LITHIUM SECONDARY BATTERY USING THE SAME

(71) Applicant: UNIST Academy-Industry Research Corporation, Ulsan (KR)

(72) Inventors: Soojin Park, Ulsan (KR); Byoungman Bang, Gyeongsan-si (KR); Jung-Pil Lee, Daejeon (KR); Hyun-Kon Song, Ulsan (KR); Jaephil Cho, Ulsan (KR)

(73) Assignee: Unist Academy-Industry Research Corporation, Ulsan (KR)

( * ) Notice: Subject to any disclaimer, the term of this patent is extended or adjusted under 35 U.S.C. 154(b) by 0 days.

(21) Appl. No.: 13/650,754

(22) Filed: Oct. 12, 2012

(65) Prior Publication Data

US 2013/0040412 A1 Feb. 14, 2013

Related U.S. Application Data

(63) Continuation of application No. PCT/KR2010/003138, filed on May 18, 2010.

(30) Foreign Application Priority Data

May 7, 2010 (KR) .................. 10-2010-0043132

(51) Int. Cl.
*H01L 21/00* (2006.01)

(52) U.S. Cl.
USPC .............. 438/49; 438/20; 438/30; 438/694; 257/E21.231; 257/E21.085

(58) Field of Classification Search
USPC .............. 438/20, 30, 49, 694; 257/E21.001, 257/E21.085, E21.231, E33.001
See application file for complete search history.

(56) References Cited

U.S. PATENT DOCUMENTS

2004/0173506 A1* 9/2004 Doktycz et al. .................. 210/85
2009/0236317 A1* 9/2009 Yost et al. ........................ 216/99

FOREIGN PATENT DOCUMENTS

KR 10-2005-0062825 6/2005
KR 10-0809929 2/2008

OTHER PUBLICATIONS

Metal-Particle-Induced, Highly Localized Site-Specific Etching of Si and Formation of Single-Crystalline Si Nanowires in Aqueous Fluoride ACHTUNGTRENUNGSolution Kuiqing Peng, *[a, b, c] Hui Fang,[a] Juejun Hu,[a] Yin Wu,[a] Jing Zhu, *[a] Yunjie Yan,[a] and ShuitTong Lee[b].*

Metal-Particle-Induced, Highly Localized Site-Specific Etching of Si and Formation of Single-Crystalline Si Nanowires in Aqueous Fluoride Solution. Kuiqing Peng,*[a, b, c] Hui Fang,[a] Juejun Hu,[a] Yin Wu,[a] Jing Zhu,*[a] Yunjie Yan,[a] and ShuitTong Lee[b]. Oct. 17, 2006.*

Fang, Hui et al., Silver catalysis in the fabrication of silicon nanowire arrays, Nanotechnology, 2006, vol. 17, pp. 3768-3774.

Wolfsteller, A. et al., Comparison of the top-down and bottom-up approach to fabricate nanowire-based silicon/germanium heterostructures, Thin Solid Films. Feb. 26, 2010, vol. 518, Issue 9, pp. 2555-2561.

* cited by examiner

*Primary Examiner* — Alexander Ghyka
*Assistant Examiner* — Abdulfattah Mustapha
(74) *Attorney, Agent, or Firm* — Lexyoume IP Meister, PLLC.

(57) ABSTRACT

A method of preparing a silicon nanowire and a method of fabricating a lithium secondary battery including the silicon nanowire are provided. The method of preparing a silicon nanowire may include forming a catalyst layer including metal particles separated from one another on a silicon layer, selectively etching the silicon layer contacting the metal particles, and removing the metal particles.

13 Claims, 20 Drawing Sheets

METHOD OF FORMING SILICON NANOWIRES AND METHOD OF FABRICATING LITHIUM SECONDARY BATTERY USING THE SAME

CROSS-REFERENCE TO RELATED APPLICATION

This application is a Continuation application of an international application of PCT/KR2010/003138 filed on May 18, 2010, which claims priority to Korean Patent Application No. 10-2010-0043132 filed on May 7, 2010, the contents of which are incorporated herein by reference.

BACKGROUND OF THE INVENTION (a) Field of the Invention

A method of forming a silicon nanowire and a method of fabricating a lithium secondary battery using the same are disclosed.

(b) Description of the Related Art

A nanomaterial has a diameter ranging from several to hundreds of nanometers. The nanomaterial has different physical, chemical, and electrical characteristics from those of a conventional material having a diameter of micrometers, and is being researched as an alternative material to overcome limits of the conventional materials.

The nano-material may be applied to various areas such as electronic equipment, optical equipment, a catalyst, a chemical sensor, and the like. Accordingly, development of various nanomaterials has been actively researched.

SUMMARY OF THE INVENTION

A method of fabricating a silicon nanowire with an easily-controlled process is provided.

A method of fabricating a lithium secondary battery using the silicon nanowire is provided.

According to one embodiment of the present invention, a method of fabricating a silicon nanowire that includes forming a catalyst layer including metal particles separated from one another on a silicon layer, selectively etching the silicon layer contacting the metal particles, and removing the metal particles is provided.

According to another embodiment of the present invention, a method of fabricating a lithium secondary battery that includes forming a catalyst layer including metal particles separated from one another on a silicon layer, selectively etching the silicon layer contacting the metal particles, and removing the metal particles.

The silicon layer may be etched through a wet etching process.

The wet etching process may be performed using a mixed solution of a fluoric acid (HF) aqueous solution and a hydrogen peroxide ($H_2O_2$) aqueous solution as an etching solution.

The formation of a catalyst layer may include forming mask particles separated from one another on the silicon layer and forming the metal particles among the mask particles.

The mask particles may include a core layer including metal ions and a polymer layer surrounding the core layer.

The method of fabricating a silicon nanowire may further include post-treatment of the mask particles after forming the catalyst layer. In the post-treatment, the polymer layer may be removed.

In addition, the metal ions are oxidized into a metal oxide in the post-treatment. The metal oxide may include $Fe_2O_3$, $Fe_3O_4$, $Al_2O_3$, $ZrO_2$, $TiO_2$, $SnO_2$, MnO, or a combination thereof.

The polymer layer may include a copolymer including an A block and a B block. The A and B blocks may be independently selected from polystyrene, polyisoprene, poly(2-vinylpyridine), poly(4-vinylpyridine), poly(ethylene oxide), poly(caprolactone), poly(lactide), poly(methylmethacrylate), poly(ethylmethacrylate), poly(butylmethacrylate), poly(acrylic acid), poly($\alpha$-methyl styrene), poly(styrene sulfonate), polybutadiene, polyurethane, polyacrylonitrile, poly(propylene oxide), and a combination thereof.

The method of fabricating a lithium secondary battery may further include forming the silicon layer on a current collector layer before forming the catalyst layer. The silicon layer may be etched until the current collector layer is exposed thereon.

Accordingly, a method of fabricating a silicon nanowire having an easily-controlled process is provided.

A method of fabricating a lithium secondary battery using the method of fabricating a silicon nanowire is further provided.

DETAILED DESCRIPTION

Hereinafter, a method of preparing a nanowire according to embodiments and a method of fabricating a lithium secondary battery are described. The embodiments are provided so that a person of ordinary skill in the art may understand the spirit of the present invention easily, and the present invention is not limited thereto. The embodiments may be modified within technical spirits and scopes of the present invention.

As used herein, the term "and/or" may refer to one including at least one of listed constituent elements. As used herein, each constituent element and/or part may be described using "first and second", which is used for clear explanation without limitation.

As used herein, one constituent element "on" another constituent element includes further positioning a third constituent element on the one constituent element as well as directly positioning the one constituent element on the other constituent element.

In addition, a thickness and/or a relative thickness of constituent elements are exaggerated for better understanding and easy description of embodiments of the present invention. Furthermore, terms related to a position such as "upper", "lower", and the like in this specification are used to indicate relative positions rather than absolute positions among constituent elements.

Referring to FIGS. 1 to 4, a method of fabricating a silicon nanowire according to one embodiment is described.

Figure 1:
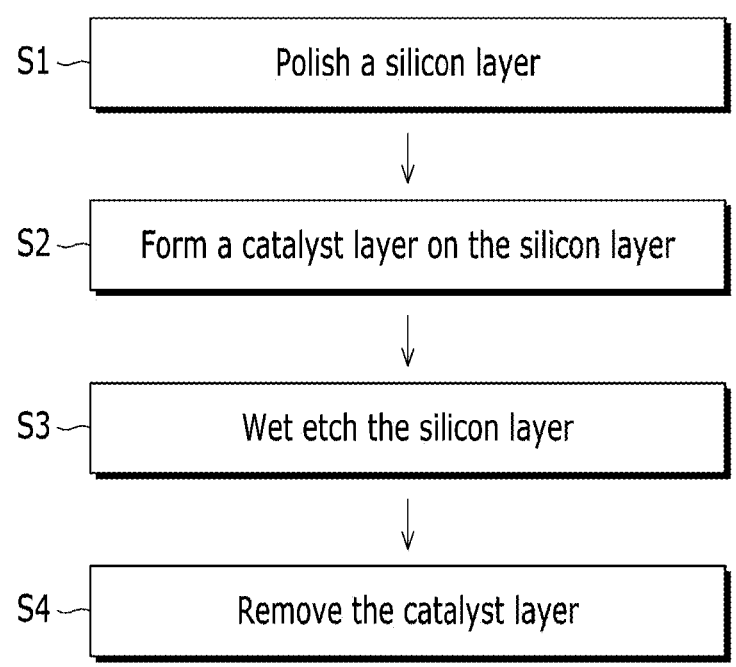
FIG. 1 is a flowchart showing a method of fabricating a silicon nanowire according to one embodiment of the present invention.
Figure 2:
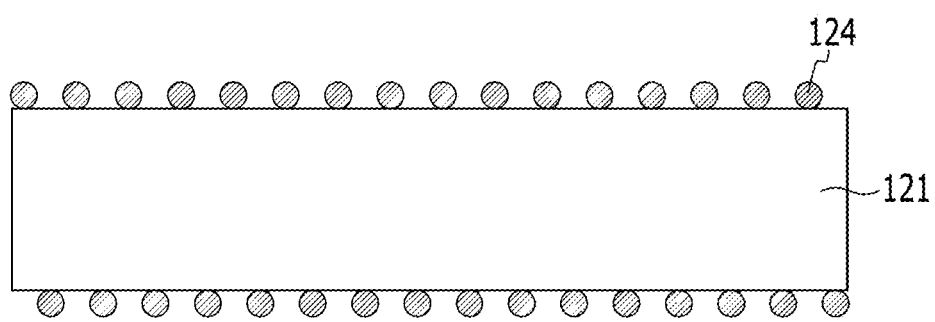
FIGS. 2 to 4 are cross-sectional process views showing the method of fabricating a silicon nanowire according to one embodiment of the present invention.
Figure 3:
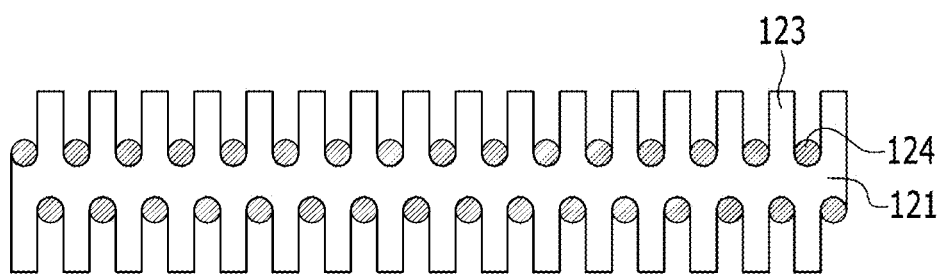
Figure 4:
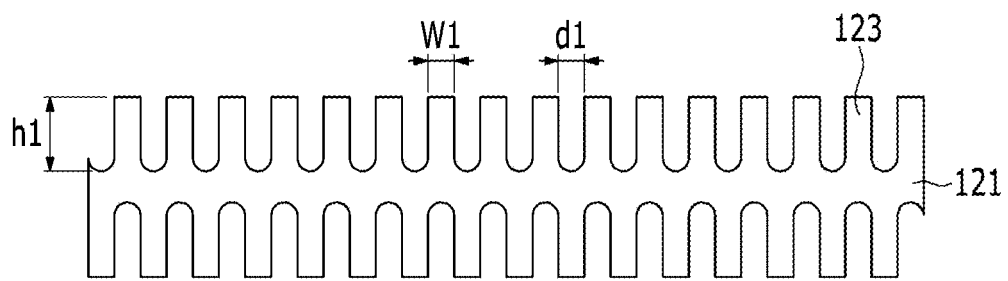

FIG. 1 is a flowchart showing a method of fabricating a silicon nanowire, and FIGS. 2 to 4 are cross-sectional process views showing the method of fabricating a silicon nanowire.

Referring to FIG. 2, a silicon layer 121 is prepared. The silicon layer 121 may be a silicon substrate. For example, the silicon layer 121 may be a silicon substrate having a crystalline plane (100), (110), or (111). The silicon layer 121 may be about 50 μm to about 500 μm thick.

The silicon layer 121 may be doped with p-type or n-type dopants. However, the silicon layer 121 may not be doped. The silicon layer 121 may have specific resistance of about 0.008 Ω·m.

Referring to FIGS. 1 and 2, the silicon layer 121 may be polished (S1). The polishing may remove impurities on the surface of the silicon layer 121. For example, the polishing may remove a silicon oxide on the surface of the silicon layer 121.

The polishing may be performed by dipping the silicon layer 121 in a polishing solution. However, the polishing may be performed by providing only one surface of the silicon layer 121 with a polishing solution.

Referring to FIGS. 1 and 2, a catalyst layer is formed on the silicon layer 121 (S2). The catalyst layer may be formed on one surface or both surfaces of the silicon layer 121. The catalyst layer may be formed using spin coating, dip coating, electroless deposition, physical deposition, chemical deposition, thermal deposition, electron beam deposition, sputtering, or a combination thereof.

The catalyst layer may include a plurality of catalyst particles 124 separated apart one another. The catalyst layer may include silver (Ag), gold (Au), platinum (Pt), or a combination thereof.

According to one embodiment, the polishing of the silicon layer 121 and forming the catalyst layer may be performed in a single process. For example, the silicon layer 121 may be dipped in a solution including fluoric acid (HF) and a metal salt to polish itself, and to simultaneously form a catalyst layer thereon.

Referring to FIGS. 1 and 3, the silicon layer 121 may be etched (S3). The etching may be performed by dipping the silicon layer 121 in an etching solution. In other words, the etching may include a wet etching process.

The wet etching process may include, for example, dipping a silicon layer 121 in an etching solution including a fluoric acid (HF) aqueous solution and a hydrogen peroxide ($H_2O_2$) aqueous solution. In one embodiment, the etching solution may include the fluoric acid in a concentration ranging from about 0.1 vol % to about 20 vol % and the hydrogen peroxide in a concentration ranging from about 0.2 vol % to about 3.0 vol %.

When the etching solution of the fluoric acid and hydrogen peroxide is used, the silicon layer 121 may be etched according to the following Reaction Scheme 1.

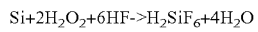
$Si+2H_2O_2+6HF \rightarrow H_2SiF_6+4H_2O$ [Reaction Scheme 1]

When the silicon layer 121 is etched, catalyst particles 124 included in the catalyst layer may be used as an etching catalyst. Accordingly, an etching rate where the silicon layer 121 contacts the catalyst particles 124 may be higher than one where the silicon layer 121 does not contact the catalyst particles 124. As a result, the silicon layer 121 may be selectively etched only where it contacts the catalyst particles 124. The silicon layer 121 is etched and formed into silicon nanowires 123.

The silicon nanowires 123 may be easily adjusted regarding length h1, thickness w1, and distance d1 by controlling conditions of the wet etching process and/or the catalyst layer.

For example, the length h1 of the silicon nanowires 123 may be adjusted by controlling the etching time and/or the concentration of the etching solution.

For another example, a distance among the catalyst particles may be adjusted by controlling concentration of metal ions in the solution when the catalyst layer is formed. Accordingly, a distance d1 among the silicon nanowires 123 may also be adjusted.

As still another example, the thickness w1 of the silicon nanowires 123 may be adjusted by controlling the size of particles including metal ions in the solution when the catalyst layer is formed. In one embodiment, the silicon nanowires 123 may have a diameter ranging from about 10 nm to about 500 nm.

Referring to FIGS. 1 and 4, the catalyst layer may be removed (S4). The catalyst layer may be removed through a wet process. In addition, the catalyst layer may be removed by using a nitric acid solution, a $KI/I_2$ mixed solution, aqua regia, molten sulfur, or a combination thereof.

Referring to FIGS. 4 to 8, a method of fabricating a silicon nanowire according to another embodiment is described.

Figure 5:
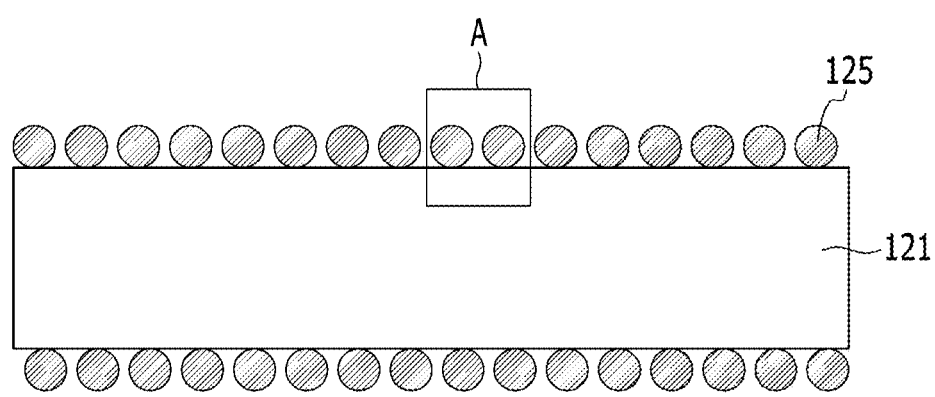
FIGS. 5 to 8 are cross-sectional process views showing a method of fabricating a silicon nanowire according to another embodiment of the present invention.
Figure 6:
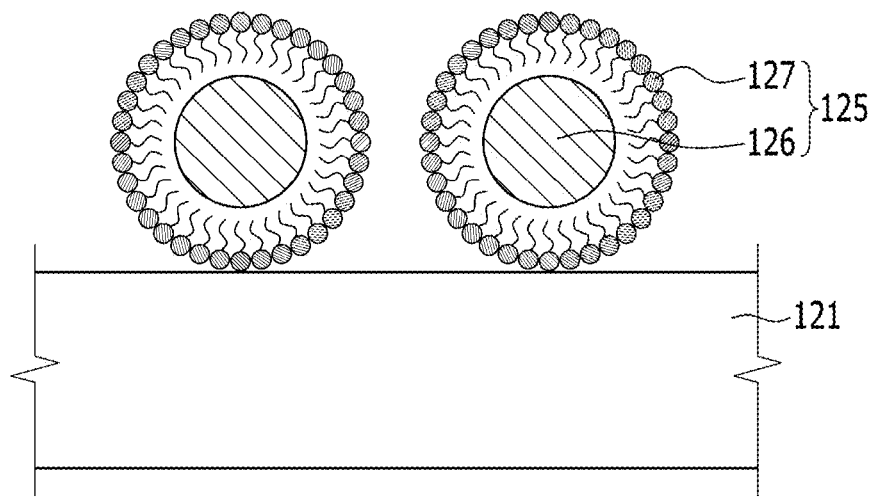
Figure 7:
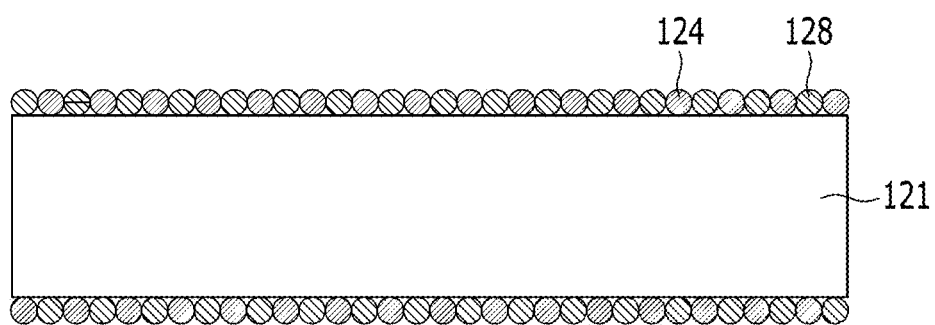
Figure 8:
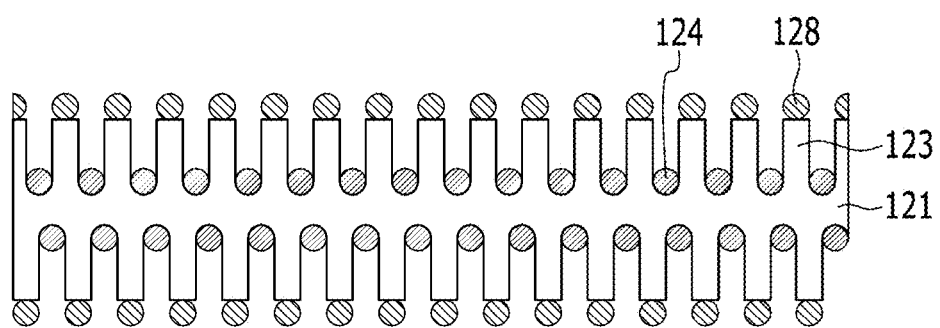

FIGS. 5, 7, and 8 are cross-sectional process views showing a method of fabricating a silicon nanowire, and FIG. 6 is an enlarged view of an A region in FIG. 5.

Referring to FIGS. 5 and 6, a mask layer may be formed on the silicon layer 121. The mask layer may include mask particles (125). The mask layer may be formed by preparing a mask solution and applying the mask solution on the silicon layer 121.

The mask solution may be prepared by dissolving polymers in a solvent and adding metal ions 126 to the solvent. The metal ions 126 may be added as a solution including a metal salt or metal ions.

The polymers may include, for example, an A-B block copolymer. Either one of the A and B blocks may be hydrophobic, while the other one may be hydrophilic. The copolymers may be dissolved in a concentration ranging from about 0.1 wt % to about 1.0 wt % in a mixed solution of the copolymers and a solvent.

For example, the A and B blocks may be independently selected from the group consisting of polystyrene, polyisoprene, poly(2-vinylpyridine), poly(4-vinylpyridine), poly (ethylene oxide), poly(caprolactone), poly(lactide), poly(methylmethacrylate), poly(ethylmethacrylate), poly (butylmethacrylate), poly(acrylic acid), poly(α-methyl styrene), poly(styrene sulfonate), polybutadiene, polyurethane, polyacrylonitrile, poly(propylene oxide), and a combination thereof. For example, the polymers may include polystyrene-block-poly(4-vinylpyridine) (PS-b-P4VP).

However, the polymers are not limited thereto and may be selected from all the polymers capable of being coordinated with the metal ions.

The A block may be included in a range of about 10 vol % to about 90 vol % in the copolymer. The B block may be included in a range of about 10 vol % to about 90 vol % in the copolymer. The copolymer may have an average molecular weight (Mw) ranging from about 5 kg/mol to about 500 kg/mol.

The metal ions 126 may include, for example iron ions, aluminum ions, zirconium ions, titanium ions, tin ions, manganese ions, or a combination thereof. Specifically, the metal ions may be added in an amount of about 0.1 to about 1.0 equivalent to the solvent based on one equivalent of the polymers in the copolymer.

The polymers may be dissolved and self-assembled to form a polymer layer 127. For example, the polymers may form a spherical or cylindrical micelle. The polymer layer 127 may be about 10 nm to about 142 nm thick.

The metal ions 126 of the metal salt are disposed on the core of the polymer layer 127 formed by the polymers and thus are coordinated with the polymers. Accordingly, mask layer including mask particles 125 including the metal ions 126 and the polymer layer 127 may be formed.

The size and thickness of the metal ions and the polymer layer may be adjusted by molecular weight of the polymers and concentration of the metal ions 126. For example, when the polymers having a relatively large molecular weight and the metal ions 126 corresponding to 1 equivalent of the polymers are added to a solvent, the polymer layer may be relatively thicker. In addition, the polymer layer may make the micelle larger, and thus the metal ions 126 may be more included in the core of the micelle.

The mask particles 125 may be used to prepare a mask solution, and then the mask solution may be spin-coated on the silicon layer 121. The mask solution may be coated on the silicon layer 121 at a speed of about 1000 rpm to about 10,000 rpm.

The mask particles 125 may be regularly arranged on the silicon layer 121. For example, the mask particles 125 may be hexagonally arranged on the silicon layer 121.

The silicon layer 121 formed by coating the mask solution may be post-treated. The post-treatment may include an ultraviolet (UV) (a wavelength of about 254 nm to about 365 nm) treatment, a heat treatment, a plasma process, or a combination thereof. The plasma process may be performed using oxygen plasma, $CF_4$ plasma, $CHF_3$ plasma, $SF_6$ plasma, or a combination thereof.

The post-treatment may provide, for example, oxygen plasma on the silicon layer 121. The post-treatment may remove the solvent of the mask solution and/or the polymer layer 127.

In the post-treatment, the metal ions 126 may be oxidized and form metal oxide particles 126. The metal oxide particles 126 may include oxides of the metal ions 126, for example, $Fe_2O_3$, $Fe_3O_4$, $Al_2O_3$, $ZrO_2$, $TiO_2$, $SnO_2$, $MnO$, or a combination thereof.

Referring to FIG. 7, catalyst particles 124 may be formed among the metal oxide particles 128.

The catalyst layer including catalyst particles 124 may be formed by providing a solution including metal ions on the silicon layer 121. For example, the catalyst layer may be formed by dipping the silicon layer 121 in the solution including metal ions or coating one side of the silicon layer 121 with the solution including metal ions. The catalyst layer may include silver (Ag), gold (Au), platinum (Pt), or a combination thereof.

The catalyst layer may be selectively formed on the silicon layer 121 not contacting the metal oxide particles 126.

Referring to FIG. 8, the silicon layer 121 may be etched. The etching of the silicon layer may be a wet etching process using the catalyst layer 124 as a catalyst. The etching may include, for example, dipping the silicon layer 121 in a mixed solution of fluoric acid (HF) and hydrogen peroxide ($H_2O_2$). In one embodiment, the fluoric acid may be included in a concentration of about 0.1 vol % to about 20 vol %, and the hydrogen peroxide may be included in a concentration of about 0.2 vol % to about 3.0 vol %. In the etching, the silicon layer 121 may be selectively etched where it contacts the catalyst layer. In this way, silicon nanowires 123 may be formed.

The silicon nanowires 123 may be easily adjusted regarding thickness and distance by controlling the size and distance of the metal particles 124 in the catalyst layer and the size and distance of the metal oxide particles 128.

Specifically, a distance among the metal particles 124 in the catalyst layer may be adjusted by the size of the metal oxide particles 128. Accordingly, the metal particles 124 may work as a catalyst and thus adjust the thickness and/or distance of the silicon nanowires 123 formed through the etching.

For example, when the metal oxide particles 128 are larger, the distance between the metal particles 124 in the catalyst layer may be wider. Accordingly, the distance among the silicon nanowires formed through the etching using the metal particles 124 as a catalyst may be wider.

For another example, the distance and thickness of the silicon nanowires 123 may be adjusted by controlling the size of the metal oxide particles 128. The metal oxide particles 126 may have a size that is adjusted by the molecular weight of the polymers and the concentration of the metal ions as aforementioned.

Referring to FIG. 4, the catalyst layer and the metal oxide particles 126 may be removed. Unlike in the drawing, the metal oxide particles 128 may not be removed. For example, when the silicon nanowires 123 are applied to a lithium secondary battery, the metal oxide particles 128 may not operate as impurities. Thus, a process of removing the metal oxide particles 128 may be omitted.

The catalyst layer may be removed in a wet process. The catalyst layer may be removed by providing a nitric acid solution, a $KI/I_2$ mixed solution, aqua regia, molten sulfur, or a combination thereof to the catalyst layer.

The aforementioned method of fabricating silicon nanowires may be applied in various fields to which a silicon nanostructure is applied. For example, the method of fabricating silicon nanowires may be applied to a method of forming a negative active material layer for a lithium secondary battery.

Figure 9:
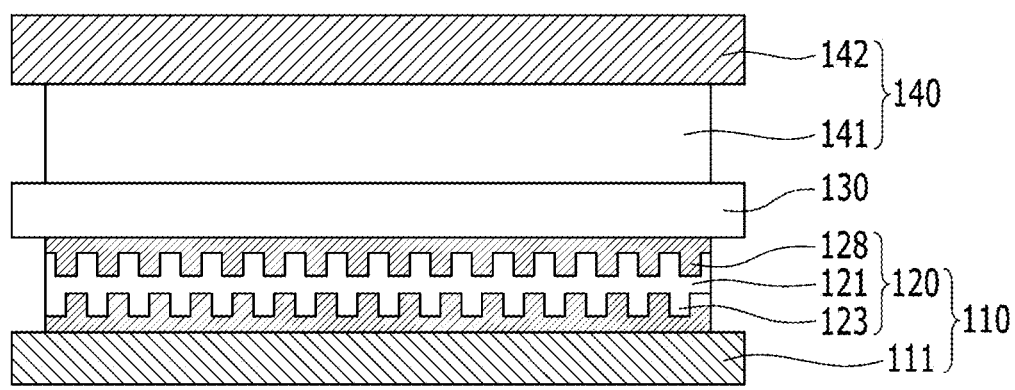
FIG. 9 is a cross-sectional view showing a lithium secondary battery according to one embodiment of the present invention.
Figure 10:
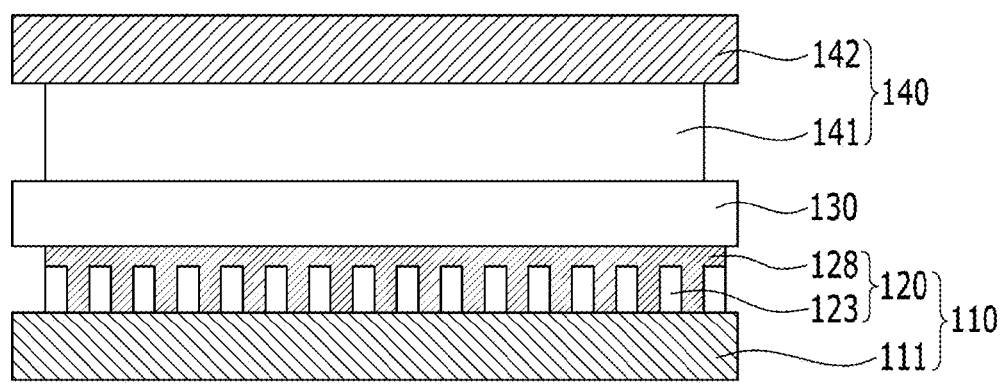
FIG. 10 is a cross-sectional view showing a lithium secondary battery according to another embodiment of the present invention.

Referring to FIGS. 9 and 10, a lithium secondary battery fabricated by applying the aforementioned method of fabricating silicon nanowires and a method of fabricating the lithium secondary battery are illustrated.

FIGS. 9 and 10 are cross-sectional views of lithium secondary batteries.

Referring to FIG. 9, a lithium secondary battery including a negative electrode 110 and a positive electrode 140 facing each other, a separator 130 disposed between the negative and positive electrodes 110 and 140, and an electrolyte connecting the negative and positive electrodes 110 and 140 is provided.

The positive electrode 140 may include a positive current collector 142 and a positive active material layer 141 between the positive current collector 142 and the separator 130.

The negative electrode 110 may include a negative current collector 111 and a negative active material layer 120 between the negative current collector 111 and the separator 130. The negative active material layer 120 may include a silicon layer 121 including silicon nanowires 123 and a binder 128 among the silicon nanowires 123.

The negative active material layer 120 may include the binder 128 prepared by filling a binder material among the silicon nanowires 123 on one surface or both surfaces of the silicon layer 121.

According to one embodiment of the present invention, the silicon nanowires 123 are additionally coated with amorphous carbon and then heat-treated. The precursor of the amorphous carbon may include a polymer resin such as coal pitch, mesophase pitch, petroleum pitch, coal-based oil, and petroleum-based heavy oil, or a phenolic resin, a furan resin, a polyimide resin, and the like. However, the silicon nanowires 123 may be coated with carbon in another method.

The negative active material layer 120 may further include a conductive agent. For example, the negative active material layer 120 may include carbon black, carbon balls, graphite, activated carbon, acetylene black, or a combination thereof among the silicon nanowires 123. The conductive agent may be uniformly mixed with the binder material and included in the negative active material layer 120.

The silicon nanowires 123 may be formed in a method of fabricating the silicon nanowires. The silicon nanowires 123 are bonded with the silicon layer 121 and then bonded with the binder as shown, and applied to a negative active material layer.

However, the silicon nanowires 123 may be separated from the silicon layer 121 and then applied to a negative active material layer. Herein, the silicon nanowires 123 may be additionally coated with carbon before being separated from the silicon layer 121. The carbon-coating may include coating the silicon nanowires 123 with the aforementioned amorphous carbon and heat-treating the coated silicon nanowires 123.

Referring to FIG. 10, the silicon nanowires 123 may be directly adhered to the negative current collector layer 111.

Specifically, after a silicon layer is formed on the negative current collector layer 111, the silicon layer may be etched in the aforementioned method of fabricating silicon nanowires. Herein, the silicon layer may be formed on the negative current collector layer 111 in a method of sputtering, atom layer deposition, chemical vapor deposition, or a combination thereof.

The silicon nanowires 123 may be directly formed on the negative current collector layer 111. Accordingly, a process of separating the silicon nanowires 123 from the silicon layer and forming the separated silicon nanowires on a negative current collector layer may be omitted. The silicon nanowires 123 may be uniformly arranged at a uniform distance on the negative current collector layer 111. Accordingly, the silicon nanowires 123 may be prevented from being cracked due to volume expansion during the charge and discharge of a lithium secondary battery.

In addition, the size and length of the silicon nanowires 123 may be maintained, since the silicon nanowires 123 do not need to be separated from the silicon layer. Accordingly, when the silicon nanowires 123 are used to prepare a negative electrode active material, the negative electrode active material may have an increased surface area and provide a lithium secondary battery having improved charge capacity.

Hereinafter, the following examples illustrate the present invention in more detail. These examples, however, should not in any sense be interpreted as limiting the scope of the present invention.

Example 1

Silicon substrates with a thickness of about 100 μm were dipped in a mixed solution of fluoric acid (HF) and silver nitrate ($AgNO_3$). Then, another mixed solution was prepared by mixing about 100 mL of an about 10 vol % fluoric acid aqueous solution and about 100 mL of a silver nitrate aqueous solution having a concentration of about 0.02 mol. The silicon substrate was dipped in the mixed solution for about 3 minutes using a TEFLON (tetrafluoroethylene) stand. This mixed solution removed a silicon oxide on the silicon substrates and coated both sides of the silicon substrates with silver ions.

The coated silicon substrate was dipped in a mixed solution of fluoric acid and hydrogen peroxide ($H_2O_2$) to perform an etching process. Then, a mixed solution prepared by mixing 142 mL of an about 10 vol % fluoric acid aqueous solution with about 142 mL of an about 1.2 vol % hydrogen peroxide solution was used. The etching process was performed for about 1 hour at about 50° C.

Figure 11:
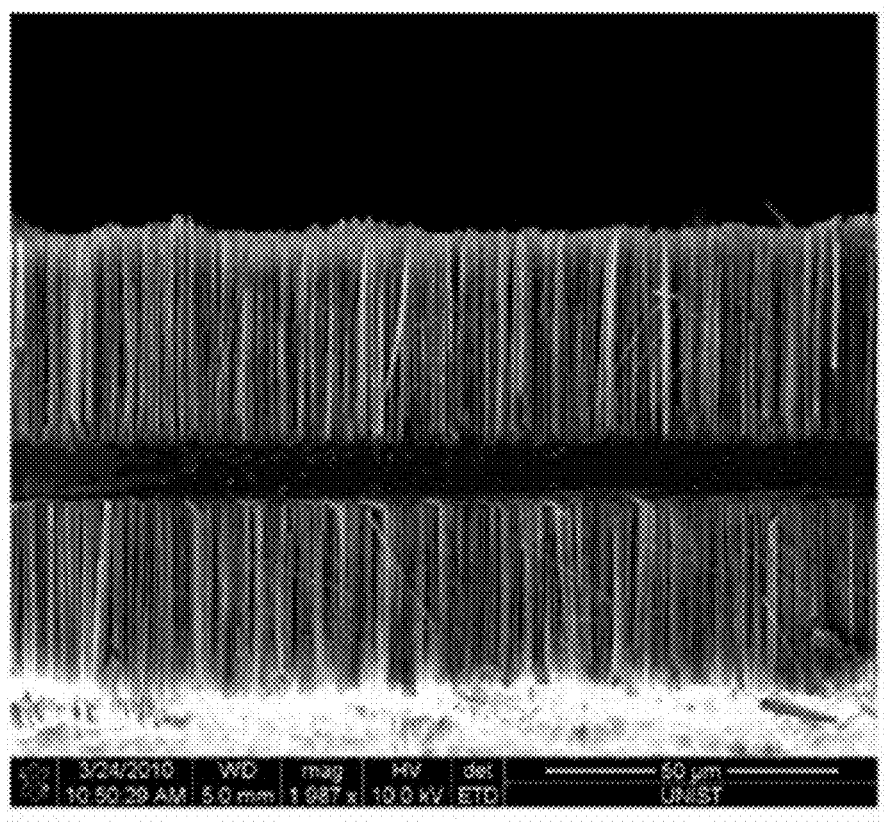
FIG. 11 is a scanning electron microscope photograph of the silicon nanowires according to Example 1.

Then, silicon nanowires fabricated in the method were examined regarding the surface using a scanning electron microscope (SEM). FIG. 11 is the scanning electron microscope photograph of the silicon nanowires according to Example 1. Referring to FIG. 11, the silicon nanowires were fabricated to have uniform width and distance as aforementioned. The nanowires were about 35 μm long.

Example 2

Silicon substrates with a thickness of about 250 μm were dipped in a mixed solution of fluoric acid (HF) and silver nitrate ($AgNO_3$). Then, another mixed solution prepared by mixing about 100 mL of an about 10 vol % fluoric acid aqueous solution and about 100 mL of an about 0.02 M silver nitrate aqueous solution was used. This mixed solution removed a silicon oxide on the silicon substrates and coated both sides of the silicon substrates with silver ions.

The coated silicon substrates were dipped in a mixed solution of fluoric acid and hydrogen peroxide ($H_2O_2$) for etching. The etched silicon substrate (hereinafter, Example 2) was dipped in a mixed solution prepared by mixing about 142 mL of an about 10 vol % fluoric acid aqueous solution and about 142 mL of an about 1.2 vol % hydrogen peroxide solution for about 2 hours. The etching was performed at about 50° C.

Example 3

A silicon nanowire was formed according to the same method as Example 2, except for dipping a silicon substrate in a mixed solution prepared by mixing about 142 mL of an about 10 vol % fluoric acid aqueous solution and 142 mL of an about 1.5 vol % hydrogen peroxide solution for about 2 hours.

Figure 12:
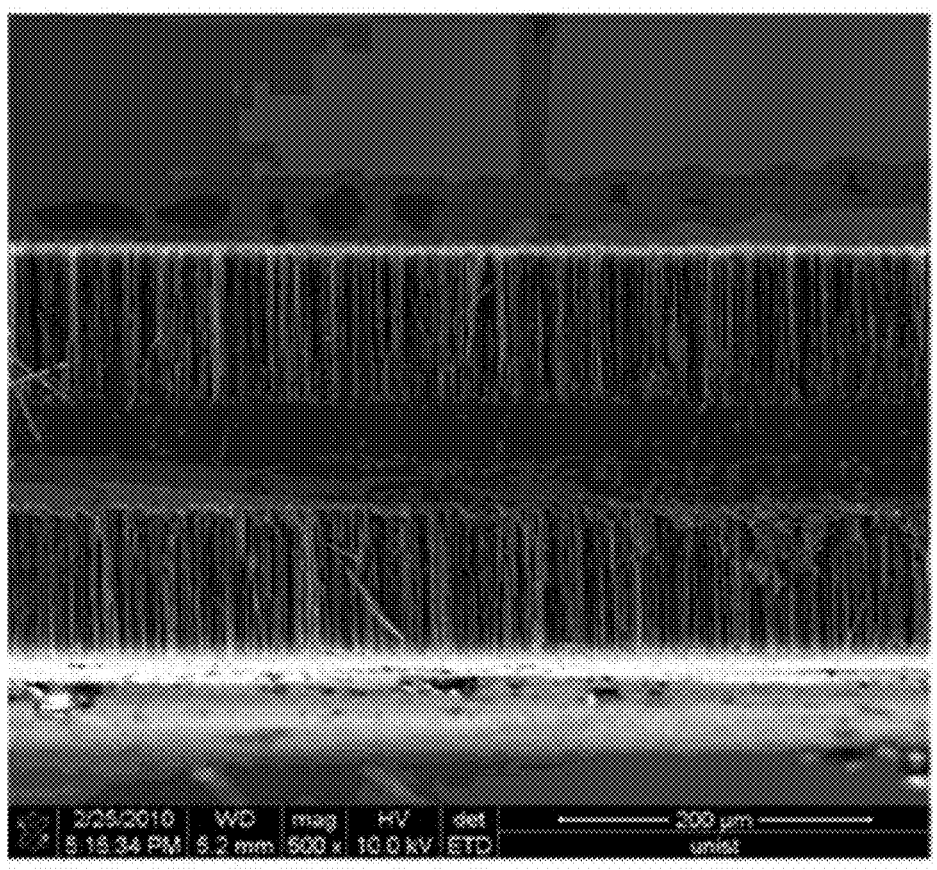
FIGS. 12 and 13 are respectively scanning electron microscope photographs of the silicon nanowires according to Examples 2 and 3.
Figure 13:
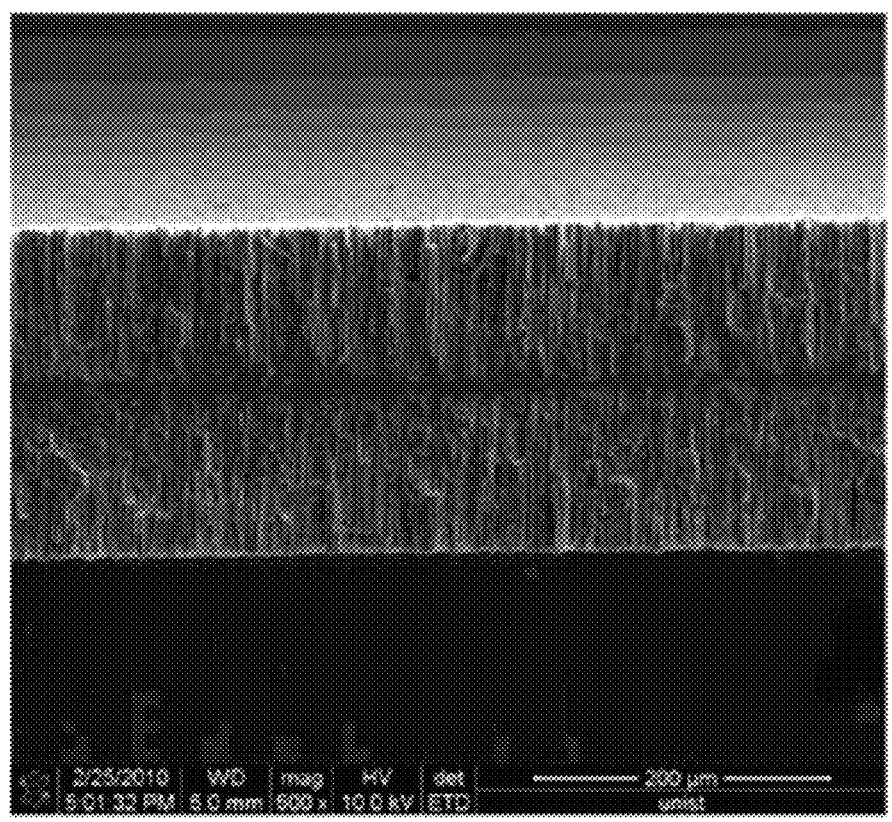

FIGS. 12 and 13 are respectively scanning electron microscopes of the silicon nanowires according to Examples 2 and 3. Referring to FIGS. 12 and 13, the silicon nanowires formed on a silicon substrate according to were about 95 μm long, while the silicon nanowires formed on a silicon substrate according to Example 3 were about 106 μm long.

Accordingly, the silicon nanowires had a length that was adjusted by the concentration of hydrogen peroxide in the mixed solution. In other words, the length of the silicon nanowires according to the exemplary embodiments of the present invention may be easily adjusted by controlling the concentration of an etching solution.

Examples 4 to 6

Silicon substrates with a thickness of about 50 μm were dipped in a mixed solution of fluoric acid (HF) and silver nitrate ($AgNO_3$). Then, a mixed solution prepared by mixing about 100 mL of an about 10 vol % fluoric acid aqueous solution and about 100 mL of an about 0.02 M silver nitrate aqueous solution was used. The mixed solution was used to remove a silicon oxide on the silicon substrates and to coat both sides of the silicon substrates with silver ions as a catalyst layer.

The coated silicon substrates were dipped in a mixed solution prepared by mixing about 142 mL of an about 10 vol % fluoric acid aqueous solution and an about 1.2 vol % hydrogen peroxide aqueous solution for etching. The silicon substrates were respectively dipped for 20 minutes (hereinafter, Example 4), 23 minutes (hereinafter, Example 5), and 25 minutes (hereinafter, Example 6) in the mixed solution. The etching was performed at about 50° C.

Figure 14:
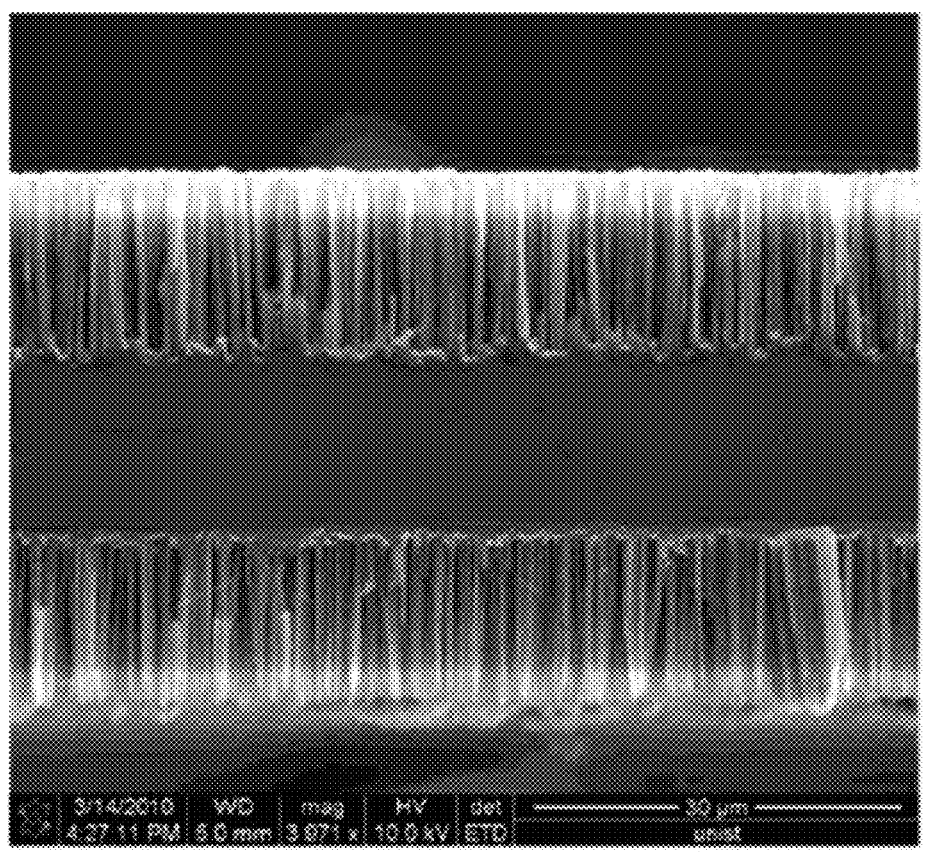
FIGS. 14 to 16 are respectively scanning electron microscope photographs showing the surfaces of the silicon nanowires according to Examples 4 to 6.
Figure 15:
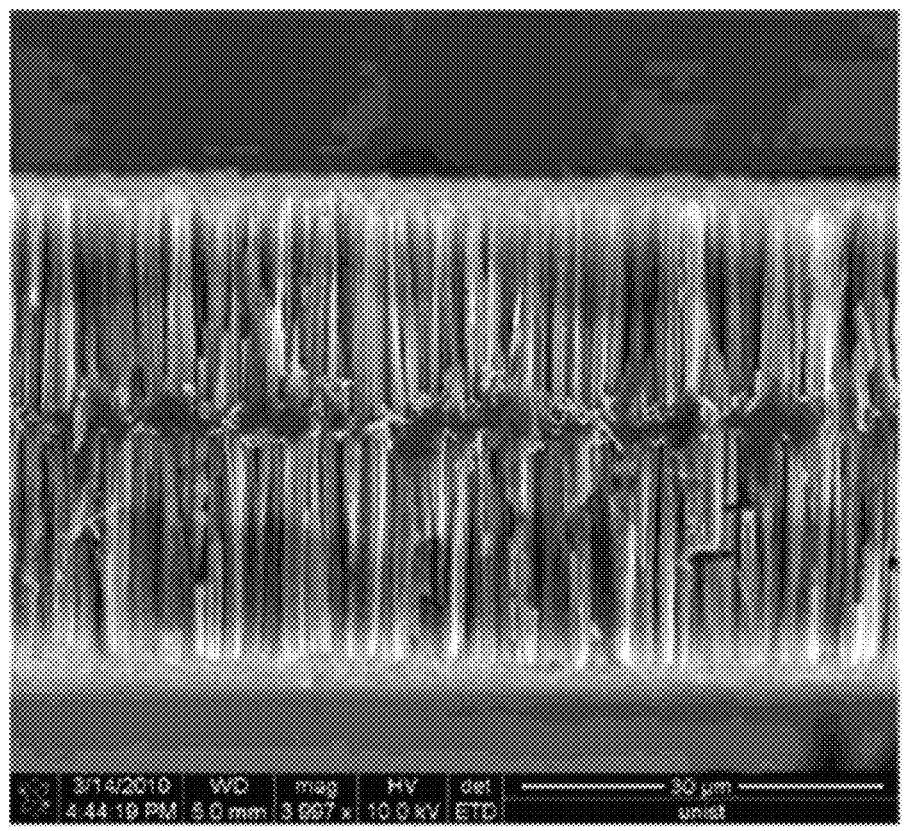
Figure 16:
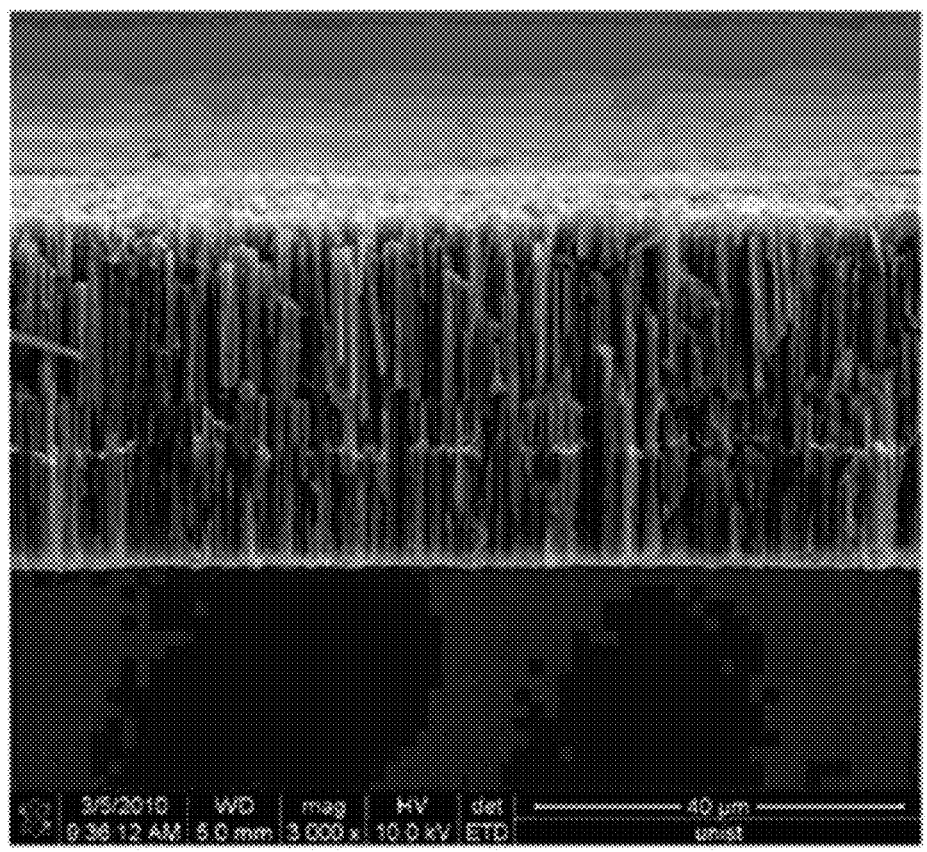
Figure 17:
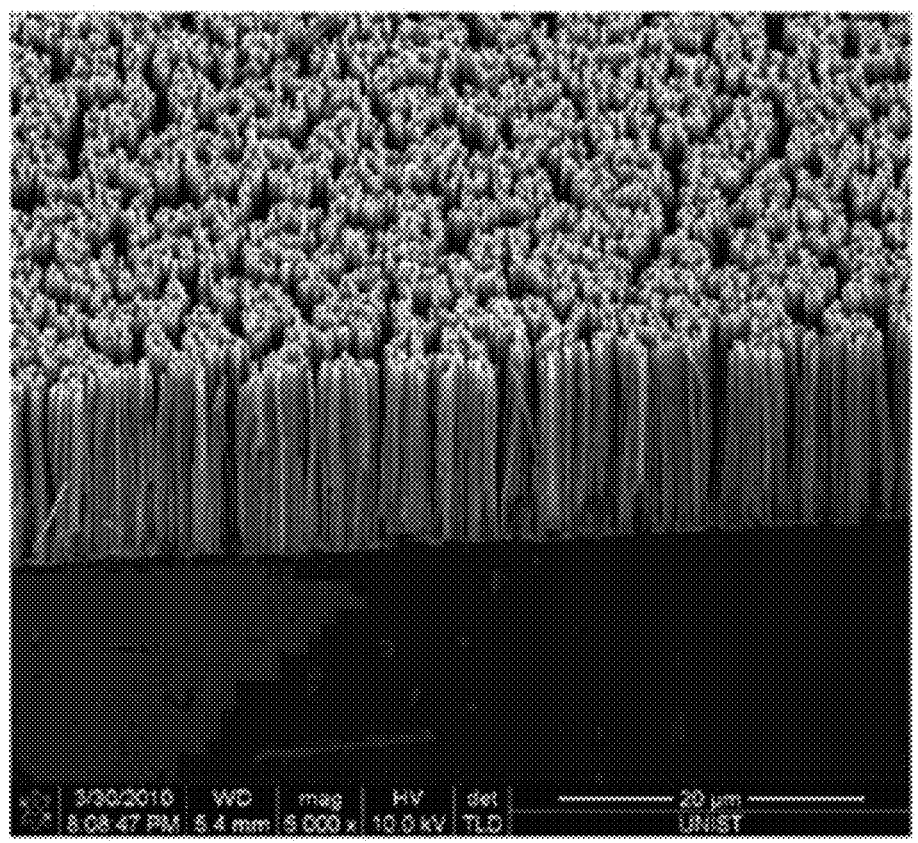
FIGS. 17, 19, 21, and 23 are respectively scanning electron microscope photographs showing the silicon nanowires according to Examples 7, 8, 9, and 10.

FIGS. 14 to 16 are respectively scanning electron microscope photographs showing the surfaces of the silicon nanowires according to Examples 4 to 6. Referring to FIGS. 14 to 16, the silicon nanowires were longer as the etching time was longer. In other words, the silicon nanowires may be easily adjusted regarding length depending on etching time.

Examples 7 to 10

A micelle was fabricated by dissolving polystyrene-block-poly(4-vinylpyridine) (PS-b-P4VP) to be 0.5 wt % in a toluene solvent. Next, $FeCl_3$ was added to the solution according to an equivalent, preparing a mixed solution. The iron ions in the $FeCl_3$ were combined to the core of the micelle.

On the other hand, four kinds of polystyrene-block-poly (4-vinylpyridine) mixed solutions were prepared depending on molecular weight and concentration of iron ions. The mixed solution according to Example 7 included about 31 kg/mol of polystyrene-block-poly(4-vinylpyridine) and about 0.5 equivalent of iron ions. The mixed solution according to Example 8 included about 31 kg/mol of polystyrene-block-poly(4-vinylpyridine) and about 1.0 equivalent of iron ions. The mixed solution according to Example 9 included about 59 kg/mol of polystyrene-block-poly(4-vinylpyridine) and about 0.5 equivalent of iron ions. The mixed solution according to Example 10 included about 136 kg/mol of polystyrene-block-poly(4-vinylpyridine) and about 1.0 equivalent of iron ions.

The mixed solutions were respectively coated on 250 μm-thick silicon substrates. The coating was performed at about 5000 rpm for about 1 minute in a spin coating method. The coated silicon substrates were treated with oxygen ($O_2$) plasma.

Next, the silicon substrates were etched according to the same method as Example 1.

FIGS. 17, 19, 21, and 23 are respectively scanning electron microscope photographs showing the silicon nanowires according to Examples 7, 8, 9, and 10. FIGS. 18, 20, 22, and 24 are respectively transmission electron microscope (TEM) photographs showing the silicon nanowires according to Examples 7, 8, 9, and 10.

Referring to FIGS. 17 to 24, the silicon nanowires had a distance and a thickness that were adjusted depending on the molecular weight and metal ion concentration of a copolymer used therein.

In addition, referring to FIGS. 17, 19, 21, and 23, the silicon nanowires were uniformly dispersed.

Figure 18:
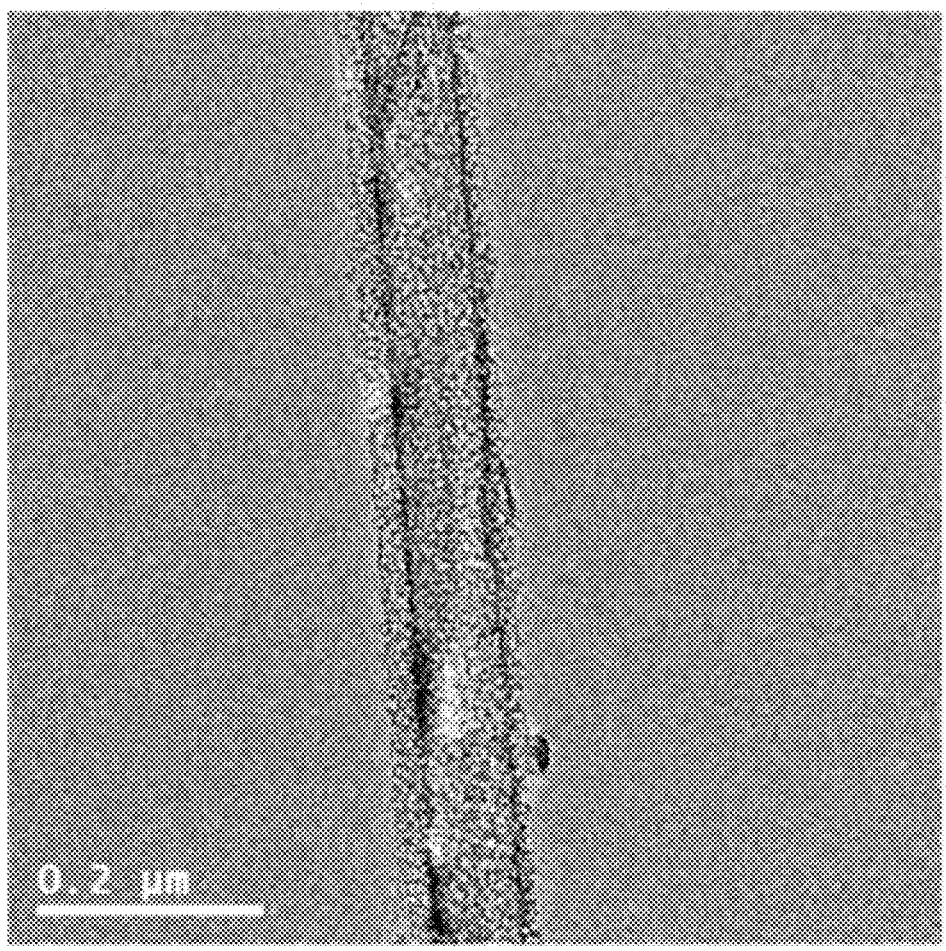
FIGS. 18, 20, 22, and 24 are respectively transmission electron microscope (TEM) photographs showing the silicon nanowires according to Examples 7, 8, 9, and 10.
Figure 19:
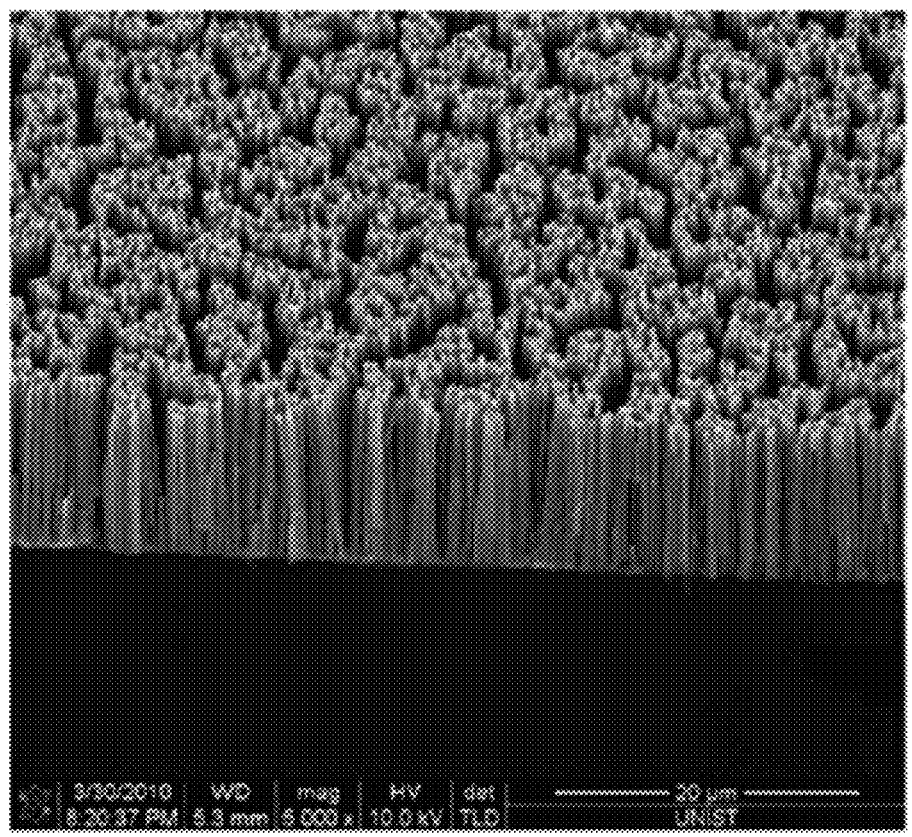
Figure 20:
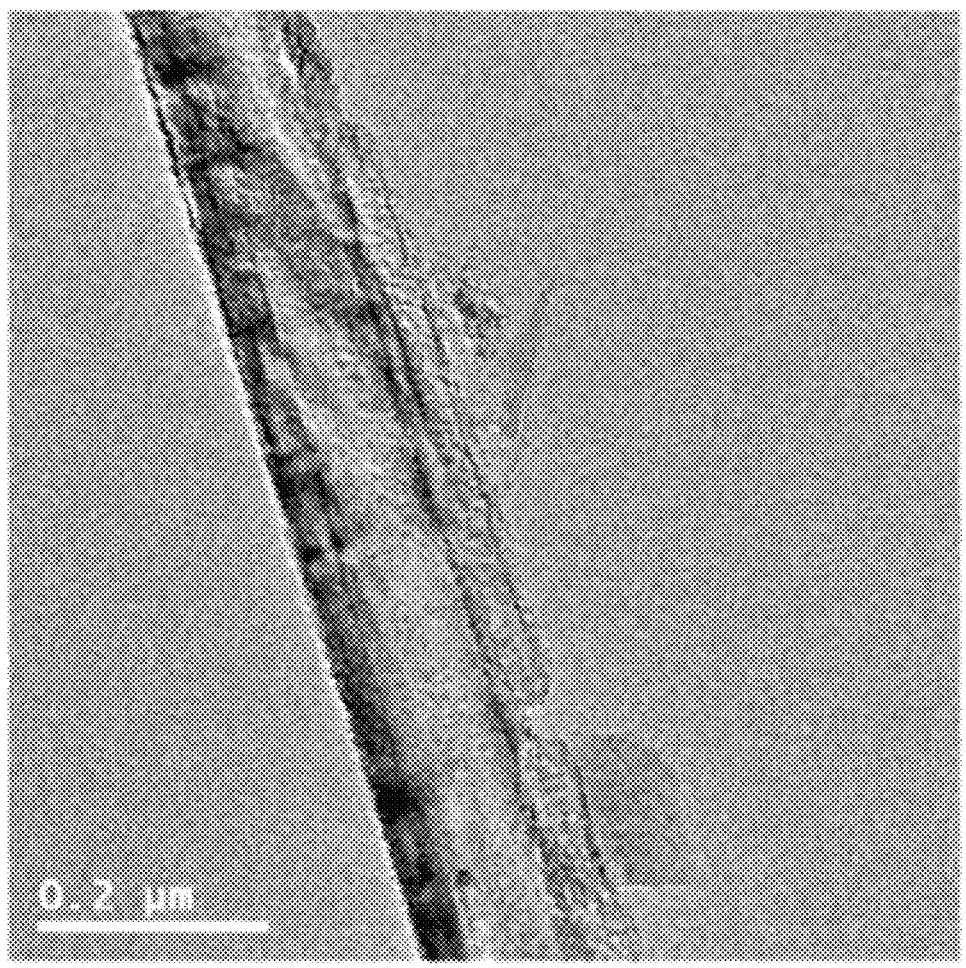
Figure 21:
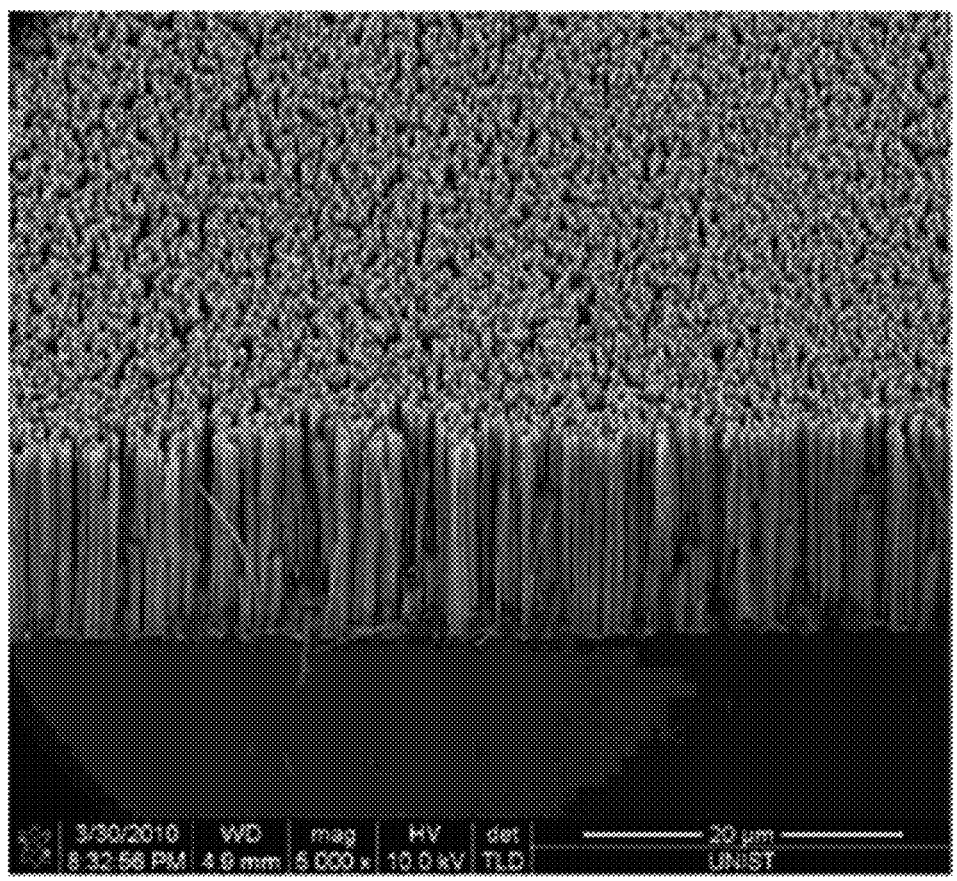
Figure 22:
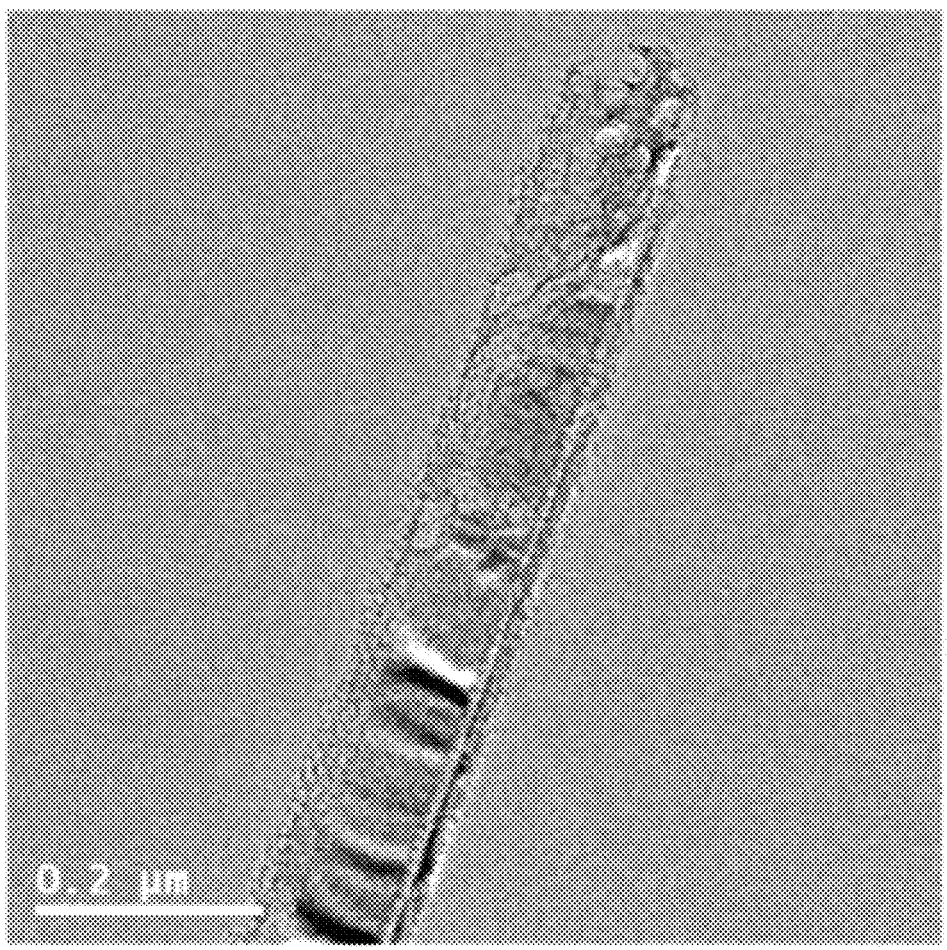
Figure 23:
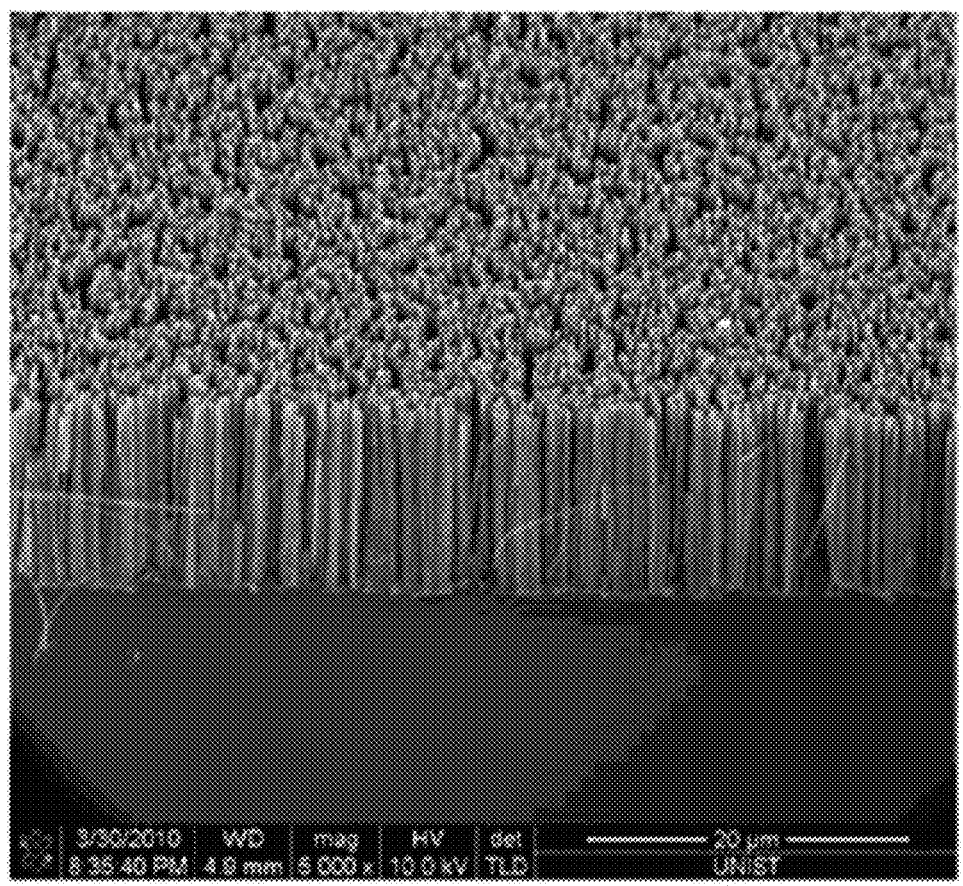
Figure 24:
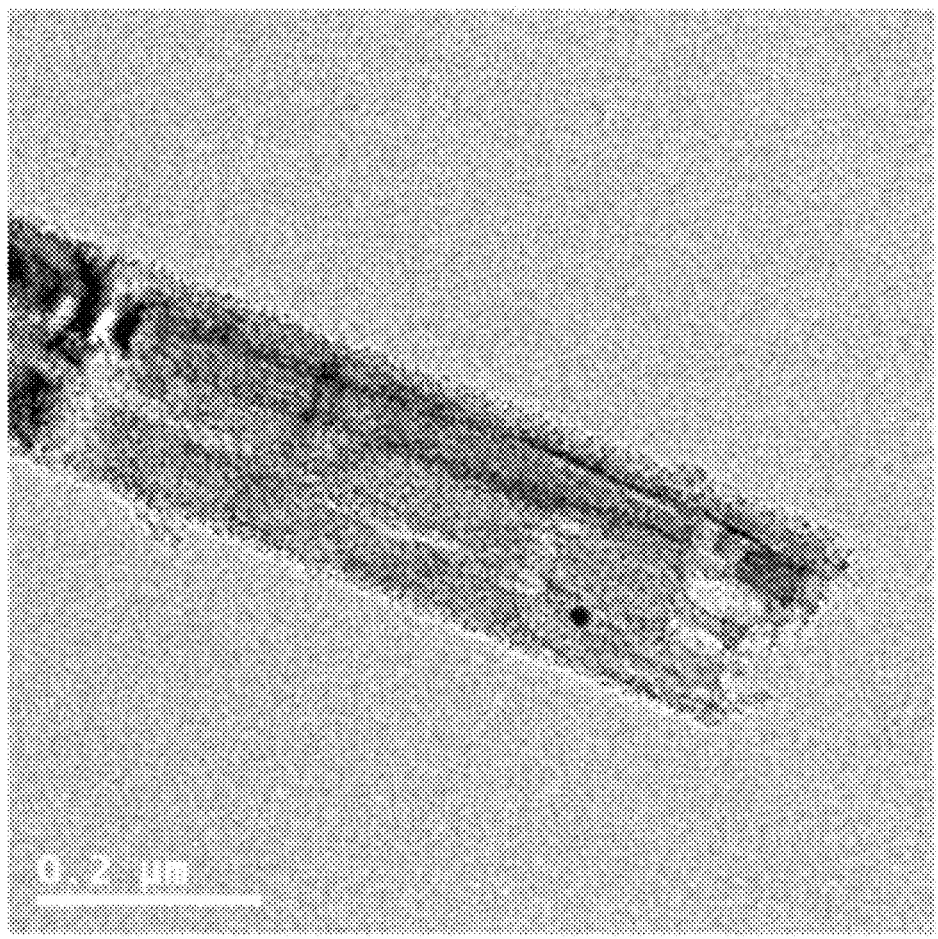

Referring to FIGS. 18 and 20, the silicon nanowires had a thickness that was adjusted by the concentration of metal ions when a copolymer having the same average molecular weight (Mw) was used. Specifically, the silicon nanowires were relatively thick when the metal ions had a high concentration.

Referring to FIGS. 17, 19, 21, and 23, the silicon nanowires had a narrower distance depending on a larger molecular weight of a copolymer when the copolymer had the same concentration of metal ions. In addition, referring to FIGS. 18, 20, 22, and 24, the silicon nanowires were relatively thick depending on a larger molecular weight when the copolymer had the same concentration of metal ions.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of Symbols>

| 121: silicon layer | 123: silicon nanowire |
|---|---|
| 124: catalyst layer | |

What is claimed is:

1. A method of preparing a silicon nanowire, comprising:
    forming a catalyst layer comprising metal particles separated from one another on a silicon material;
    selectively etching the silicon material contacting the metal particles; and
    removing the metal particles,
    wherein the forming of a catalyst layer comprises:
    forming mask particles with a material different from the metal particles and the silicon material; and
    forming the metal particles among the mask particles.

2. The method of claim 1, wherein the silicon silicon material is wet etched.

3. The method of claim 2, wherein the wet etching are performed using a mixed solution of a fluoric acid (HF) aqueous solution and a hydrogen peroxide ($H_2O_2$) aqueous solution as an etching solution.

4. The method of claim 1, wherein the mask particles comprise a core layer including metal ions and a polymer layer surrounding the core layer.

5. The method of claim 4, wherein the mask particles are post-treated after forming the catalyst layer, and
    the polymer layer is removed through the post-treatment.

6. The method of claim 5, wherein the metal ions are oxidized into a metal oxide through the post-treatment, and the metal oxide comprises $Fe_2O_3$, $Fe_3O_4$, $Al_2O_3$, $ZrO_2$, $TiO_2$, $SnO_2$, MnO, or a combination thereof.

7. The method of claim 4, wherein the polymer layer is a copolymer including blocks A and B, and the blocks A and B independently comprise polystyrene, polyisoprene, poly(2-vinylpyridine), poly(4-vinylpyridine), poly(ethylene oxide), poly(caprolactone), poly(lactide), poly(methylmethacrylate), poly(ethylmethacrylate), poly(butylmethacrylate), poly (acrylic acid), poly(α-methyl styrene), poly(styrene sulfonate), polybutadiene, polyurethane, polyacrylonitrile, poly (propylene oxide), or a combination thereof.

8. A method of fabricating a lithium secondary battery, comprising:
    forming a silicon material on a current collector layer;
    forming a catalyst layer comprising metal particles arranged at a predetermined distance on the silicon material which is formed on the current collector layer;
    etching the silicon material using the metal particles as a catalyst to form silicon nanowires; and
    removing the metal particles.

9. The method of claim 8, wherein the silicon material is etched through a wet etching process.

10. The method of fabricating a lithium secondary battery of claim 8, wherein the formation of the catalyst layer comprises:
   forming mask particles separated from one another on the silicon material; and
   forming the metal particles among the mask particles.

11. The method of claim 10, wherein the mask particles comprise a core layer comprising metal ions and a polymer layer surrounding the core layer.

12. The method of claim 8, wherein the silicon material is etched until the current collector layer is exposed.

13. A method of fabricating a lithium secondary battery, comprising:
   forming a catalyst layer comprising metal particles arranged at a predetermined distance on silicon material;
   etching the silicon material using the metal particles as a catalyst to form silicon nanowires;
   removing the metal particles; and,
   coating the silicon nanowires with carbon.

* * * * *